United States Patent

[11] 3,575,261

| [72] | Inventors | George E. Medawar<br>San Diego;<br>Felix Hom, La Mesa, Calif. |
|---|---|---|
| [21] | Appl. No. | 869,084 |
| [22] | Filed | Oct. 24, 1969 |
| [45] | Patented | Apr. 20, 1971 |
| [73] | Assignee | Rohr Corporation<br>Chula Vista, Calif. |

[54] FAN JET SILENCER WITH FLUID MIXTURE
2 Claims, 2 Drawing Figs.

[52] U.S. Cl. .................................................. 181/51,
239/127.3, 239/265.17
[51] Int. Cl. ................................................ R64d 33/06
[50] Field of Search ........................................ 239/127.3,
265.17; 181/43, 51, 33.22, 33.221, 33.222,
(Inquired)

[56] References Cited
UNITED STATES PATENTS

| 2,944,623 | 7/1960 | Bodine, Jr. .................... | 181/43 |
| 2,959,917 | 11/1960 | McGehee .................... | 181/33.221UX |
| 2,987,883 | 6/1961 | Lawler .................... | 181/33.221UX |
| 3,027,710 | 4/1962 | Moytner .................... | 239/127.3 |
| 3,053,340 | 9/1962 | Kutney .................... | 181/33.221UX |
| 3,442,350 | 5/1969 | O'Brien .................... | 181/33.221UX |
| 3,463,402 | 8/1969 | Langston, Jr. .................... | 181/33.221UX |

*Primary Examiner*—Henson M. Wood, Jr
*Assistant Examiner*—Reinhold W. Thieme
*Attorney*—George E. Pearson ABSTRACT: A tubular housing is disposed in spaced relation around thrust nozzle of aircraft turbofan engine and extends downstream from aft end thereof, fan air of said engine being discharged through the annulus between the housing and nozzle. Tubes are connected at one end thereof to edges of openings spaced around periphery of the nozzle and at other end thereof to edges of openings spaced apart around periphery of a hollow ring coaxially mounted within nozzle at the aft portion thereof, so that portion of fan air flowing through the aforesaid annulus enters tubes and is discharged from a circular slot in the aft end of the ring into central portion of primary exhaust gas stream flowing through nozzle, the remainder of the fan air flowing around the stream discharged from the nozzle.

PATENTED APR 20 1971 3,575,261

INVENTOR.
GEORGE E. MEDAWAR
FELIX HOM

BY Edwin D. Grant

ATTORNEY

FAN JET SILENCER WITH FLUID MIXTURE

This invention relates to jet-propelled aircraft and more particularly to means for suppressing the noise associated with the operation of an aircraft turbofan engine. Part of the noise associated with the operation of a jet-propelled aircraft results from the flow through the atmosphere of the high-velocity, high-temperature exhaust gas which is discharged from the engine, or engines, thereof. The amount of noise so generated by streams of jet-engine exhaust gas is proportionate to their temperature and velocity. In accordance with the present invention, fan air and primary exhaust gas of a turbofan engine are mixed together within a thrust nozzle attached to said engine, thereby forming a jet stream the temperature and velocity of which are respectively lower than the temperature and velocity of the exhaust gas itself. The noise of the stream of combined air and exhaust gas is thus less than that which would be generated if the exhaust gas were discharged to the atmosphere as a separate stream. More specifically, in a preferred embodiment of the present invention a tubular housing is concentrically spaced around a thrust nozzle attached to the aft end of a turbofan engine, the housing extending downstream from the aft end of the nozzle. The annular space between the housing and the nozzle communicates with the fan section of the engines so that its fan air flows therethrough and is discharged into the portion of said housing located downstream from said nozzle. Apertures extend through and are spaced apart around the aft end of the nozzle wall, and tubes are respectively joined to the edges of these apertures and extend inwardly and rearwardly from said wall into the stream of exhaust gas flowing through the nozzle. Mounted on the inner ends of the aforesaid tubes and coaxially disposed relative to the nozzle is a hollow ring having a circular slot formed in the aft end thereof, apertures extending through the wall of the ring at the points where the tubes are joined thereto. A portion of the fan air flowing through the space between the housing and the nozzle enters the tubes and flows therethrough to the interior of the ring, this air then being discharged through the slot in the aft end of the latter and into the exhaust gas flowing through the nozzle. Thus at the aft end of the described propulsion apparatus two annular streams of fan air are respectively discharged into and around the stream of engine exhaust gas, which provides the advantage previously stated.

DETAILED DESCRIPTION

Figure 1:
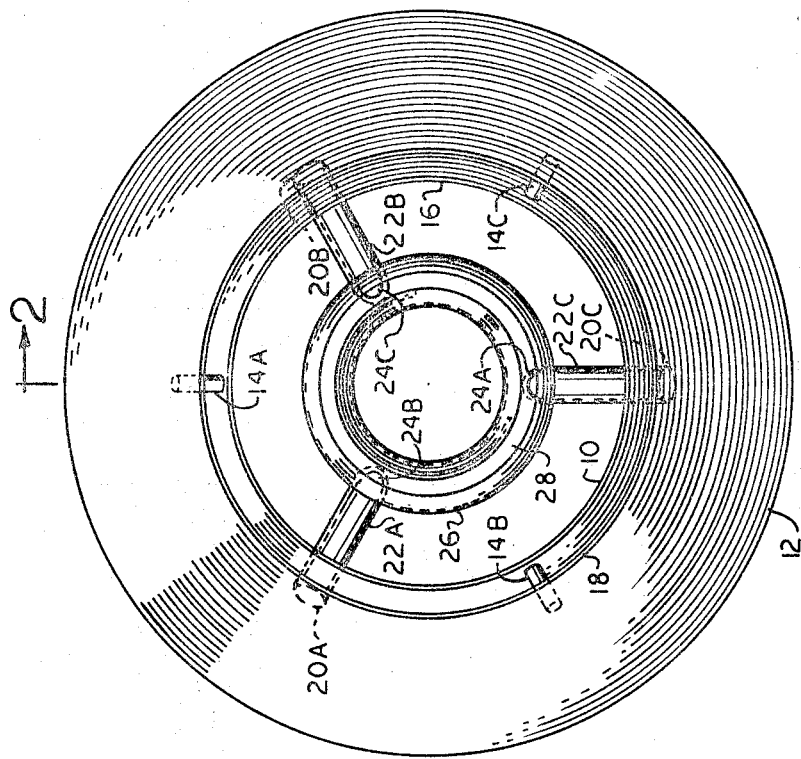
FIG. 1 is a rear elevation of the preferred embodiment of the invention.

The drawings illustrate a frustoconical thrust nozzle 10 which is attached to the aft end of a turbofan jet engine (not shown) so that the primary exhaust gas of the latter flows therethrough. Disposed in concentric, spaced relation around the nozzle is a tabular housing 12. More explicitly, the aft portion of the housing is frustoconical in shape so as to conform with the nozzle and provide an annular gap therebetween. Three struts 14A—14C are immovably attached to the outer surface of the nozzle and to the inner surface of the housing, these struts being evenly spaced apart around the aft end of said nozzle as illustrated in FIG. 1. By means of suitable ducts (not shown), fan air of the turbofan engine is conducted to the gap between the nozzle and the housing and flows therethrough in an annular stream. The aft edge 16 of nozzle 10 and the aft edge 18 lie in planes disposed perpendicular to the longitudinal axis of the nozzle.

Three apertures 20M—20C extend through the wall of nozzle 10 at its aft end, these apertures being evenly spaced apart circumferentially of said nozzle and equidistant from the aft edge thereof. Three tubes 22A—22C are respectively attached to the edges of apertures 20A—20C and extend inwardly and rearwardly therefrom. The inner ends of said tubes are respectively attached to the edges of three apertures 24A—24C which extend through the forward portion of the wall of a hollow ring 26 coaxially disposed within nozzle 10 adjacent the aft end thereof. As can be seen in FIG. 1, a circular slot 28 is formed in the aft end of the ring.

OPERATION

Figure 2:
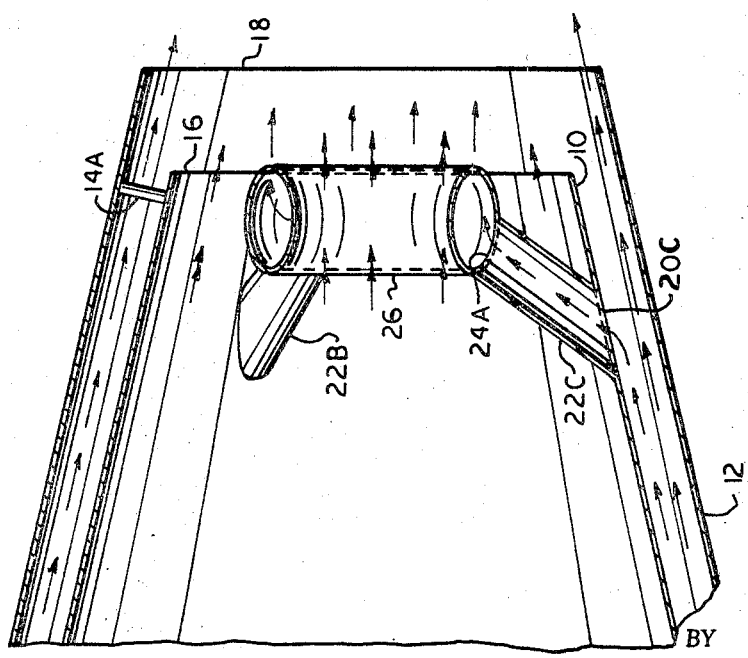
FIG. 2 is a longitudinal sectional view of the same apparatus, taken along the plane represented by line 2-2 in FIG. 1 and in the direction indicated by arrows therein.

In FIG. 2 double-headed arrows represent the flow of exhaust gas of the turbofan engine connected to nozzle 10, whereas single-headed arrows represent the flow of fan air of said engine. A portion of the fan air flowing through the gap between the nozzle and housing 12 enters tubes 22A—22C and flows therethrough to the interior of ring 28, from whence it flows through slot 28 into the stream of exhaust gas. The remainder of the fan air flows around the stream of exhaust gas and air discharged from the nozzle. Thus cool, relatively low-velocity fan air is mixed with the hot, high-velocity thrust gas and effects sound suppression as explained hereinbefore.

It will be recognized that details of construction of the disclosed apparatus can be varied without departing from the basic principle of its operation. For example, in some embodiments of the invention the aft edge 18 of housing 12 may be coterminous with, or spaced forward from, the aft edge 16 of nozzle 10. Hence the scope of the invention should be considered to be limited only by the terms of the appended claims.

We claim:

1. In an aircraft having a turbofan engine, the combination comprising: a thrust nozzle through which exhaust gas of said engine is discharged, a plurality of apertures extending through the wall of said nozzle and spaced apart circumferentially thereof; a tubular housing disposed in spaced relation around said nozzle, the space between said nozzle and said housing being communicatively connected with the fan section of said engine so that fan air flows therethrough in a substantially annular stream; a plurality of tubes respectively fixedly attached to the wall of said nozzle in register with said apertures and extending inwardly therefrom into the interior of said nozzle; a hollow ring mounted on the inner ends of said tubes in coaxial relation with said nozzle, said tubes respectively registering with apertures which extend through the wall of said ring, a slot extending circumferentially around the aft end of said ring, whereby a portion of said fan air enters said tubes and flows therethrough to said ring and thence flows through said slot into said exhaust gas flowing through said nozzle, the remainder of said fan air flowing around the stream discharged from said nozzle.

2. The combination defined in claim 1 wherein the aft end of said housing extends downstream from the aft end of said nozzle.